United States Patent Office 3,705,884
Patented Dec. 12, 1972

3,705,884
VISCOUS COMPOSITIONS AND PROCESS FOR THE PRODUCTION THEREOF
Albert Frese, Marl, Germany, assignor to Chemische Werke Huels, Aktiengesellschaft, Marl, Germany
No Drawing. Filed June 19, 1970, Ser. No. 47,868
Claims priority, application Germany, June 20, 1969, P 19 31 421.7
Int. Cl. C08f *15/40;* C10m *1/18*
U.S. Cl. 260—80.78                    11 Claims

ABSTRACT OF THE DISCLOSURE

Viscous atactic polyolefin compositions having viscosities which are less temperature dependent and which have relatively low viscosities at 100° C., which are useful as lubricating oils, cable filling compounds and in the manufacture of roofing board and sealing compounds, are produced from a mixture of polyolefins produced with a Ziegler catalyst and polyolefin produced with a Friedel-Crafts catalyst, preferably produced by successively polymerizing an olefin mixture comprising butene-1, first with the Ziegler catalyst and then with the Friedel-Crafts catalyst.

BACKGROUND OF THE INVENTION

This invention relates to viscous mixtures of atactic polyolefins.

For various fields of application, for example for cable filling compounds, atactic poly-α-olefins are required having low molecular weights and low viscosities, e.g., 100–10,000 centipoises at 100° C.

The atactic poly-α-olefin, e.g., polybutene-1, obtained as a by-product during the manufacture of isotactic poly-α-olefins, exhibits a reduced specific viscosity of 0.3–1.0 (measured in a 0.03% decalin solution at 135° C.). However, their melt viscosity is high. For example, atactic polybutene-1 has a viscosity at 100° C. of 100,000–200,000 cp. The substantially amorphous polybutene-1 produced in polymerizations employing catalysts of low stereospecificity exhibits a reduced specific viscosity ranging above 0.5 and a melt viscosity at 100° C. above 100,000 cp. Thus, these products are unsuited for use as cable filling compounds, etc.

It is not possible to produce low molecular weight polymers with the desired properties in conventional polymerizations because the hydrogen control, which is normally effective in low-pressure polymerizations, fails even at a high partial hydrogen pressure, so that it is impossible to attain a value below a specific viscosity of 0.3. Also, due to thermal and/or radical degradation, the desired low viscosities cannot be regulated in an economical manner. Not only is such a process quite expensive, it has the disadvantage that the thus-obtained low-molecular polymers are contaminated by cracking products.

OBJECTS OF THE INVENTION

It is an object of this invention to provide a process for producing polymeric compositions having the above-described properties, more specifically viscous atactic α-olefin compositions, in an easy, simple, and reproducible fashion. It is another object to provide novel atactic α-olefin compositions. Other objects will be apparent to those skilled in the art to which this invention pertains.

SUMMARY OF THE INVENTION

According to this invention, viscous polyolefin compositions, especially those having a viscosity of 100–10,000 cp. at 100° C. are provided by a mixture of polyolefins consisting essentially of 5–95% by weight of mainly atactic poly-α-olefin or a polyolefin mixture comprising poly-α-olefin with an atactic portion of 50–95% by weight and having a reduced specific viscosity of 0.05–5.0 and 95–5% by weight of an atactic polyolefin or a polyolefin mixture comprising an atactic polyolefin and having a viscosity of 150–60,000 cp. at 20° C. Such compositions can be produced by a process which comprises the steps of partially polymerizing a mixture of an α-olefin and an internally unsaturated olefin with a Ziegler catalyst and thereafter further polymerizing the polymerizate with a Friedel-Crafts catalyst.

DETAILED DESCRIPTION

The compositions of this invention consist essentially of the products of two polymerizations, viz, one which produces a polyolefin having a reduced specific viscosity of 0.05–5.0, preferably 0.2–2.0, as a 0.03% decalin solution at 135° C., and one which produces a polyolefin having a viscosity of 150–60,000 cp., preferably 300–30,000 cp. at 20° C. The former ordinarily, i.e., at room temperature, is a solid of a viscosity too high to measure. The latter is a slightly to highly viscous fluid.

The compositions of this invention include those obtained by mixing two separately polymerized components having the properties described herein. Preferred are those obtained by first partially polymerizing an α-olefin or mixture of olefins comprising an α-olefin, with a Ziegler catalyst of low stereospecificity and then, optionally after replenishing the consumed olefin with the same or other olefin or olefins, continuing the polymerization with a Friedel-Crafts catalyst.

Suitable olefins are, for example, propene, butene, 4-methyl-1-pentene, 1-dodecene, and mixtures comprising one or more of them. Preferably employed are butene-1 and mixtures comprising butene-1 and other olefins, especially mixtures also comprising butene-2, e.g., mixtures of olefins containing butene-1 and one or more of ethene, propene, 4-methylpentene, and/or styrene in addition to butene-2, especially cis-butene-2.

An especially preferred starting olefin mixture is a $C_4$-cut containing, e.g., 20–80%, preferably 30–60%, butene-1; 10–30%, preferably 15–20%, cis-butene-2; 10–30%, preferably, 20–25%, trans-butene-2; and 2–20%, preferably 5–15%, butane.

The same or different olefin mixture can be used in the two polymerizations, e.g. when the two polymerizations are conducted as separate polymerizations or additional olefins are added to the polymerizate of the first polymerization before conducting a second polymerization thereof. Preferably a mixture of butenes is present in both such polymerizations.

The Ziegler catalyst is able to polymerize butene-1 only; butene-2 is practically not polymerized. The Friedel-Crafts-catalyst polymerizes butene-2 and butene-1, too, if the latter is still present in the mixture.

The first polymerizate contains 50–95% by weight atactic portions, the second polymer consists completely of atactic material. The atactic portions are defined by their solubility in boiling diethyl ether.

The poly-α-olefin which is produced by the first polymerization step is soluted nearly completely under the conditions of the polymerization. It has a reduced specific viscosity ranging between 0.05 and 5.0, preferably between 0.2 and 2.0, and its solubility in boiling diethyl ether ranges between 50 and 95%, preferably between 60 and 80%.

In the especially preferred embodiment of this invention, the only olefins present at the beginning of the second polymerization are those present in the polymerizate of the first polymerization. In this process aspect of this invention, the $C_4$-cuts containing butene-1 and butene-2 have the advantage that the butene-1 is first polymerized into atactic polybutene with the Ziegler catalyst in the first polpmerization and thereafter the unreacted butene-2 is polymerized with the Friedel-Crafts catalyst in the second polymerization into oily polybutenes.

The Ziegler catalysts employed in the first polymerization are those of low stereospecificity, viz, the conventional mixed Ziegler catalysts, e.g., a mixture of one or more heavy metal compounds, e.g., titanium tetrachloride, vanadium tetrachloride, vanadium oxychloride, with an organoaluminum compound, e.g., trialkylene aluminum and dialkyl aluminum hydrides wherein the alkyl groups contain 2–12 carbon atoms, e.g., $Al(C_2H_5)_3$, $Al(C_3H_7)_3$, $Al(C_4H_9)_2H$, $Al(i-C_4H_9)_3$. Furthermore, suitable are mixtures of heavy metal compounds, e.g., a mixture of $TiCl_4$ with $VCl_4$ or $VOCl_3$. The polymerization to the atactic poly-α-olefins is usually conducted at elevated temperatures, e.g., 50–200° C., more preferably 70–150° C.

These mixed Ziegler catalysts are conventionally composed of heavy metal and aluminum compounds in a molar ratio of 0.1:1 to 10:1, preferably 0.5:1 to 5:1. They usually are employed in amounts of 0.1–0.5%, based on the monomer and solvent mixture. They are usually employed in amounts of about 0.1 to 0.5%, preferably about 0.2 to 0.3%, calculated on the total reaction mixture.

Suitable Friedel-Crafts catalysts are, for example, $AlCl_3$, $FeCl_3$, $BF_3$, $SbCl_5$, $SnCl_4$, $TiCl_4$, $ZnCl_2$, $BCl_3$, $BF_3$-etherate, and $AlCl_3 \cdot BF_3$. They are usually employed in a large molar excess, calculated on the Zeigler catalyst employed in the first polymerization, viz, in amounts of 100–2,000, preferably 200–1,000 mol percent, calculated on the alkyl aluminum compound, particularly when the polymerizate from the first polymerization is employed in the second polymerization because the Friedel-Crafts catalyst, e.g., $AlCl_3$, reacts with the residual trialkyl aluminum of the Ziegler catalyst to form alkyl aluminum sesquichlorides. It is also possible to convert the residual Ziegler catalyst, after the desired polymerization therewith, into a Friedel-Crafts catalyst by adding a stoichiometric amount, or a small excess, of anhydrous hydrogen halide or halogen. An example is the reaction of $Al(C_2H_5)_3$ with HCl or $Cl_2$ as follows:

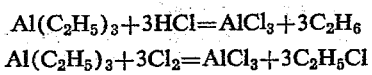

$$Al(C_2H_5)_3 + 3HCl = AlCl_3 + 3C_2H_6$$

$$Al(C_2H_5)_3 + 3Cl_2 = AlCl_3 + 3C_2H_5Cl$$

For this purpose, halogen or hydrogen halide is introduced under agitation into the partially polymerized charge, e.g., at −20° C. to +100° C., preferably at or below the temperature to be employed in the second polymerization. The polymerization with the Friedel-Crafts catalysts can be conducted at temperatures of −20° C. to +100° C., preferably 10 to 40° C.

Especially suitable olefins for the Friedel-Crafts catalyzed polymerization are the butenes, such as, for example, $C_4$-hydrocarbon cuts containing butene-1 and butene-2. The conversion takes place almost quantitatively calculated on the butene-1 and cis-butene-2 employed. The trans-butene-2, usually also present in these $C_4$-cuts, polymerizes somewhat more slowly. The $C_4$-cuts containing isobutene also can be employed.

If desired, the α-olefins consumed in the first stage of the polymerization, or a part thereof, can be replenished, during the polymerization, preferably when changing over to the Friedel-Crafts catalyst, by adding the same or another α-olefin. For example, it is advantageous, after the polymerization of a mixture of butene-1 with methylpentene or dodecene with a Ziegler catalyst, to polymerize a mixture of butene-1, butene-2 and isobutene with a Friedel-Crafts catalyst in the second polymerization.

The polymerizations can be carried out batch-wise or continuously. In a continuous polymerization, the Friedel-Crafts polymerization is conducted in one kettle and the polymerizate therefrom transferred continuously to a second kettle separate for the kettle in which the first polymerization is conducted.

The compositions of this invention have a viscosity of 1000 to >100,000 cp. at 20° C. and 20 to 80,000 cp. at 100° C. The preferred compositions have a viscosity of 7,000 to >100,000 cp. at 20° C. and 100 to 10,000 cp. at 100° C.

The compositions of this invention contain 5 to 95%, preferably 10 to 50%, of the polymerizate of the Ziegler catalyzed polymerization. As stated above, the preferred compositions are those resulting from the Friedel-Crafts catalyst catalyzed polymerization of the polymerizate of a Ziegler catalyst catalyzed partial polymerization of a mixture of olefins comprising an α-olefin, preferably butene-1, especially a $C_4$-hydrocarbon cut comprising butene-1 and butene-2, which mixture optionally also is added to the polymerizate of the first polymerization prior to the second polymerization.

Compared to mixtures of atactic polyolefins with, for example, paraffin oil, the compositions produced in accordance with this invention exhibit the surprising advantage that the components thereof are substantially more compatible, so that the low-molecular components, such as, for example, the polybutene oils, do not seep out. The compositions of this invention having a lower proportion of first step polymerizate, for example less than 20%, are highly viscous oils which exhibit very good lubricating properties and, surprisingly, their viscosity is relatively little temperature dependent. This temperature dependence is, for example, substantially less than that of a low molecular weight polyisobutene oil. A polyisobutene oil, exhibiting a viscosity at 20° C. of 27,000 cp., has only a viscosity of 11,200 cp. at 30° C. In contrast thereto, the viscosity of a lubricating oil of the present invention is lowered, between 20 and 30° C., from 23,000 cp. to 15,000 cp., or from 29,000 to 20,000 cp.

The compositions of this invention are useful, inter alia, as lubricants having an improved viscosity characteristic, as additives to lubricating oils to improve the viscosity thereof, as rolling oils, as pore-controlling agents in foam production, and, when having a higher proportion of first step polyolefins, as sealing compounds, such as cable filling compounds.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Into a 40-liter pressurized polymerization kettle equipped with a stirrer, there is charged 18 parts by weight of a $C_4$-cut of 56% butene-1, 16% cis-butene-2, 20% trans-butene-2, and 8% butane. By way of a charging valve, 0.015 part by weight of titanium tetrachloride and 0.057 part by weight of a 20% solution of triethyl-aluminum in hexane are added to the reaction mixture. The polymerization is conducted with this catalyst system for two hours at 130° C., under agitation.

The polymerizate of the first polymerization has a reduced viscosity of 0.5 and is soluble in boiling diethyl ether in an amount of 74% by weight.

Thereafter, the charge is quickly cooled to 20° C. After the addition of 0.2 part by weight of anhydrous aluminum chloride by way of a charging valve, the polymerization is continued at 20° C. After eight hours, the polymerization is terminated.

After the polymerization, the C₄-cut has the following composition:

| | Percent |
|---|---|
| Trans-butene-2 | 48.2 |
| Cis-butene-2 | 1.7 |
| Butene-1 | 0.2 |
| Butane | 49.8 |

After the polymerization, the catalyst is washed out with water. In a simple refining distillation unit, the readily boiling components and the residual water are distilled off at 120° C./10 mm., leaving 12.4 parts by weight of a viscous mass which, at 30° C., exhibits a viscosity of 52,000 cp. At 20° C., the viscosity amounts to 67,000 cp. The composition is suitable as rolling oil and lubricant.

EXAMPLE 2

In accordance with the procedure of Example 1, the polymerization is conducted in separate runs with the $TiCl_4/Al(C_2H_5)_3$ catalyst (K1) for one, 1½, 3 and 4 hours, respectively. The polymerizate is amorphous essentially and has a reduced viscosity of 0.5.

After adding the $AlCl_3$, the polymerization is then conducted, in each instance, for 8 hours at 20° C. The properties of the highly viscous oils, or viscous compositions, thus-obtained are set forth in Table 1.

TABLE 1

| | Experiment number | | | | Polyisobutene for comparison |
|---|---|---|---|---|---|
| | 2.1 | 2.2 | 2.3 | 2.4 | |
| Polymerization time (hrs.) with— | | | | | |
| Catalyst K1 | 1 | 1.5 | 3 | 4 | |
| Catalyst K2 | 8 | 8 | 8 | 8 | |
| Viscosity at— | | | | | |
| 20° C. in cp | 6,400 | 23,000 | 149,000 | | 27,000 |
| 30° C. in cp | 3,400 | 15,000 | 138,000 | | 11,200 |
| 50° C in cp | 1,050 | 4,600 | 42,000 | | 2,200 |
| 100° C. in cp | 80 | 190 | 1,050 | 3,200 | |

These highly viscous oils exhibit satisfactory lubricating properties. They are suitable as lubricating oils, rolling oils, and serve as pore controlling agents during the foam material production. The highly viscous products of Experiments 2.3 and 2.4 are well suitable as cable filling compound.

EXAMPLE 3

In a pressure-resistant 40-liter kettle equipped with a stirrer, 18 parts by weight of a C₄-cut is provided, consisting of 34% butene-1, 30% trans-butene-2, 18% cis-butene-2, and 18% butane. By way of a charging valve, 0.018 part by weight of $TiCl_4$, 0.0095 part by weight of $VCl_4$, and 0.08 part by weight of $Al(C_2H_5)_3$ (as a 20% solution in hexane) are added to the reaction mixture. The polymerization takes place within 5 hours at 90° C.

The polymerizate which is produced in this polymerization step has a reduced viscosity of 1.2. 76% by weight of it are soluble in boiling diethyl ether.

After cooling to 10° C., 47 Nl. of HCl is added. The kettle is maintained at 10° C. by cooling. After 10 hours the catalyst is washed out with water and thereafter the composition is dried at 10 mm. Hg and 100° C. There is thus obtained 9.1 parts by weight of a viscous mass exhibiting a viscosity of 2,100 cp. at 100° C. It is especially suitable for use as a cable filling compound.

EXAMPLE 4

15 parts by weight of a C₄-cut of 50% butene-1, 24% trans-butene-2, 17% cis-butene-2, and 9% butane, and 3 parts by weight of 4-methyl-1-pentene are polymerized at 80° C. within 4 hours with a catalyst of 0.018 part by weight of $TiCl_4$, 0.09 part by weight of $VOCl_3$, and 0.07 part by weight of $Al(C_2H_5)_3$. The polymerizate has a reduced viscosity of 1.7 and 64% by weight of it are soluble in boiling diethyl ether.

After cooling to 20° C., 41 Nl. of HCl is added and the polymerization is continued at 20° C. After working-up according to Example 3, 12.3 parts by weight of a viscous composition is obtained. It is suitable for use as a sealing compound and for the production of roofing board.

EXAMPLE 5

In a 40-liter pressure kettle equipped with agitator and level control and maintained at 100° C., are continuously introduced under stirring, per hour, 8 parts by weight of butene with a butene-1 content of 50%, 1 part by weight of 1-dodecene, and a catalyst suspension of 0.007 part by weight of titanium tetrachloride, 0.008 part by weight of triethylaluminum in 0.1 part by weight of hexane.

The polymer solution from the first polymerization is continuously transferred from the kettle via a level-controlled shut-off element, into a second 40-liter kettle, which is maintained at 30° C. by cooling. Into this kettle are continuously charged per hour 0.07 part by weight of aluminum chloride and 2 parts by weight of a C₄-cut, consisting of 40% isobutene, 30% butene-1, 24% butene-2, and 6% butane. The product discharged from the second polymerization kettle is filtered, after the addition of 0.1 part by weight per hour of calcium hydroxide, at 120° C. and then freed of more readily boiling components at 10 mm. Hg and 120° C. There is obtained 5 parts by weight per hour of a viscous composition which is suitable for use as a sealing compound and for the manufacture of roofing board.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the polymerization of a mixture of olefins containing up to 12 carbon atoms comprising an α-olefin and an internally unsaturated butene which comprises the successive steps of partially polymerizing the mixture with a Ziegler catalyst of low stereospecificity at a temperature of about 50° to 200° C. and thereafter further polymerizing the polymerizate with a Friedel-Crafts catalyst at a temperature of about −20° to +100° C.

2. A process according to claim 1 wherein the mixture of olefins is a mixture of butenes.

3. A process according to claim 2 wherein the mixture of butenes consists predominantly of butene-1.

4. A process according to claim 1 wherein first polymerization is conducted at a substantially higher temperature than the second polymerization.

5. A process according to claim 1 wherein the polymerizations are conducted continuously, the reaction product of the first being the starting reaction mixture of the second.

6. A process according to claim 5 wherein the catalyst in the first polymerization comprises $TiCl_4$ and in the second polymerization comprises $AlCl_3$.

7. A process according to claim 6 wherein additional olefin is added to the reaction product of the first polymerization prior to the second polymerization.

8. A process according to claim 1 in which a mixture of butenes is partially polymerized in the first polymerization at a temperature from about 70 to 150° C. with a Ziegler catalyst comprising $TiCl_4$ and the polymerization is completed in the second polymerization at a temperature from about 10 to 40° C. with $AlCl_3$ as the Friedel-Crafts catalyst.

9. A process according to claim 2 wherein the Ziegler catalyst is a mixture of one or more heavy metal compounds with an organolithium compound or a mixture of heavy metal compounds.

10. A process according to claim 2 wherein the Friedel-Crafts catalyst is a halide of Al, Fe, B, Sb, Sn, Ti or Zn.

11. A process according to claim 9 wherein the Friedel-Crafts catalyst is a halide of Al, Fe, B, Sb, Sn, Ti or Zn.

References Cited

UNITED STATES PATENTS

| | | | |
|---|---|---|---|
| 2,637,720 | 5/1953 | Schneider | 260—82 |
| 2,956,989 | 10/1960 | Jezl | 260—88.2 |
| 3,250,755 | 5/1966 | Natta | 260—88.2 |
| 3,324,094 | 6/1967 | Tanaka | 260—88.2 |
| 3,324,098 | 6/1967 | Rice | 260—93.7 |
| 3,356,661 | 12/1967 | Coleman | 260—85.3 |
| 3,489,731 | 1/1970 | Imoto | 260—80.78 |
| 2,889,314 | 6/1959 | Fritz | 260—94.9 |
| 3,250,825 | 5/1966 | Martinovich | 260—897 |
| 3,317,500 | 5/1967 | Edwards | 260—93.7 |
| 3,317,501 | 5/1967 | Edwards | 260—93.7 |

OTHER REFERENCES

Takihiko Shimizu, Takayuki Otsu, and Minoru Imoto: "The Polymerization of Butene-2 by Triethylaluminum-Titanium Trichloride Catalyst," Journal of Polymer Science, Part B, vol. 3, No. 6, June 1965, pp. 449–453, Interscience Publishers; a division of John Wiley & Sons, New York.

JAMES A. SEIDLECK, Primary Examiner

R. S. BENJAMIN, Assistant Examiner

U.S. Cl. X.R.

252—59; 260—33.6 PQ, 88.2 R